Patented Feb. 24, 1953

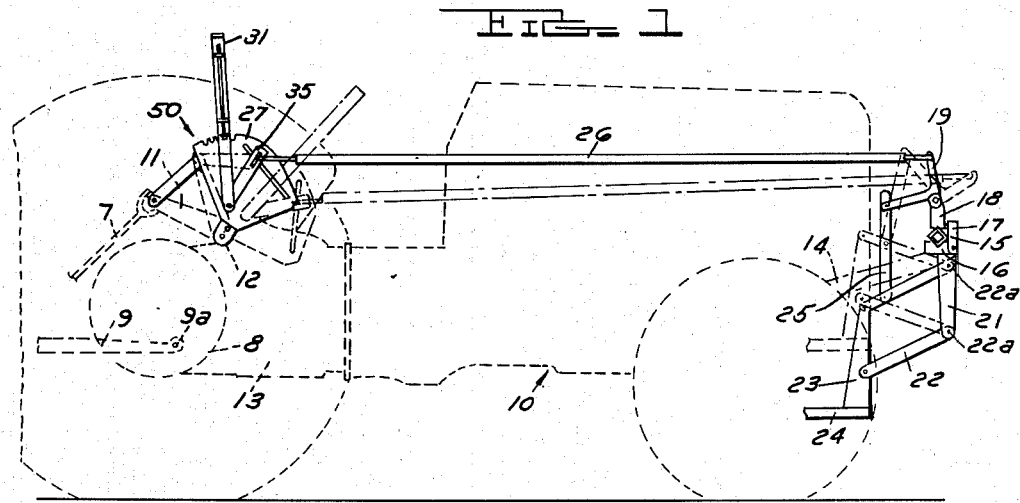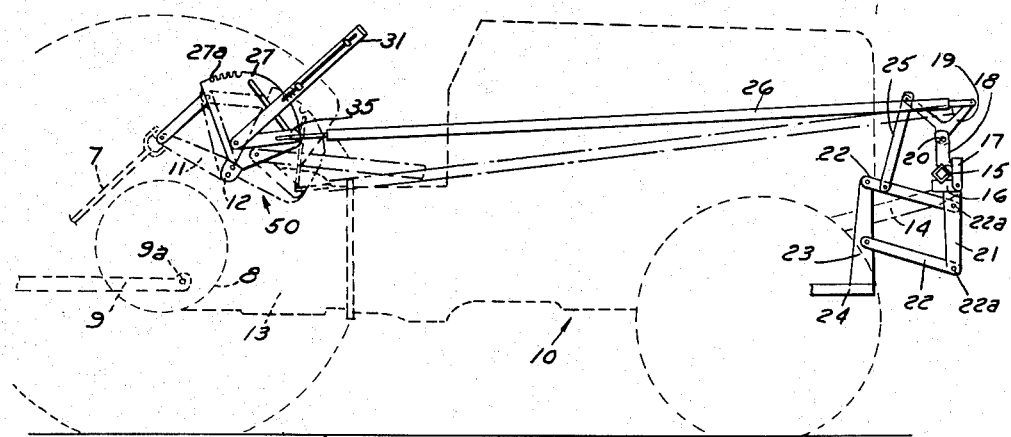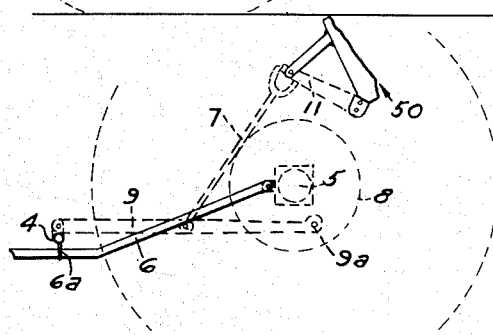

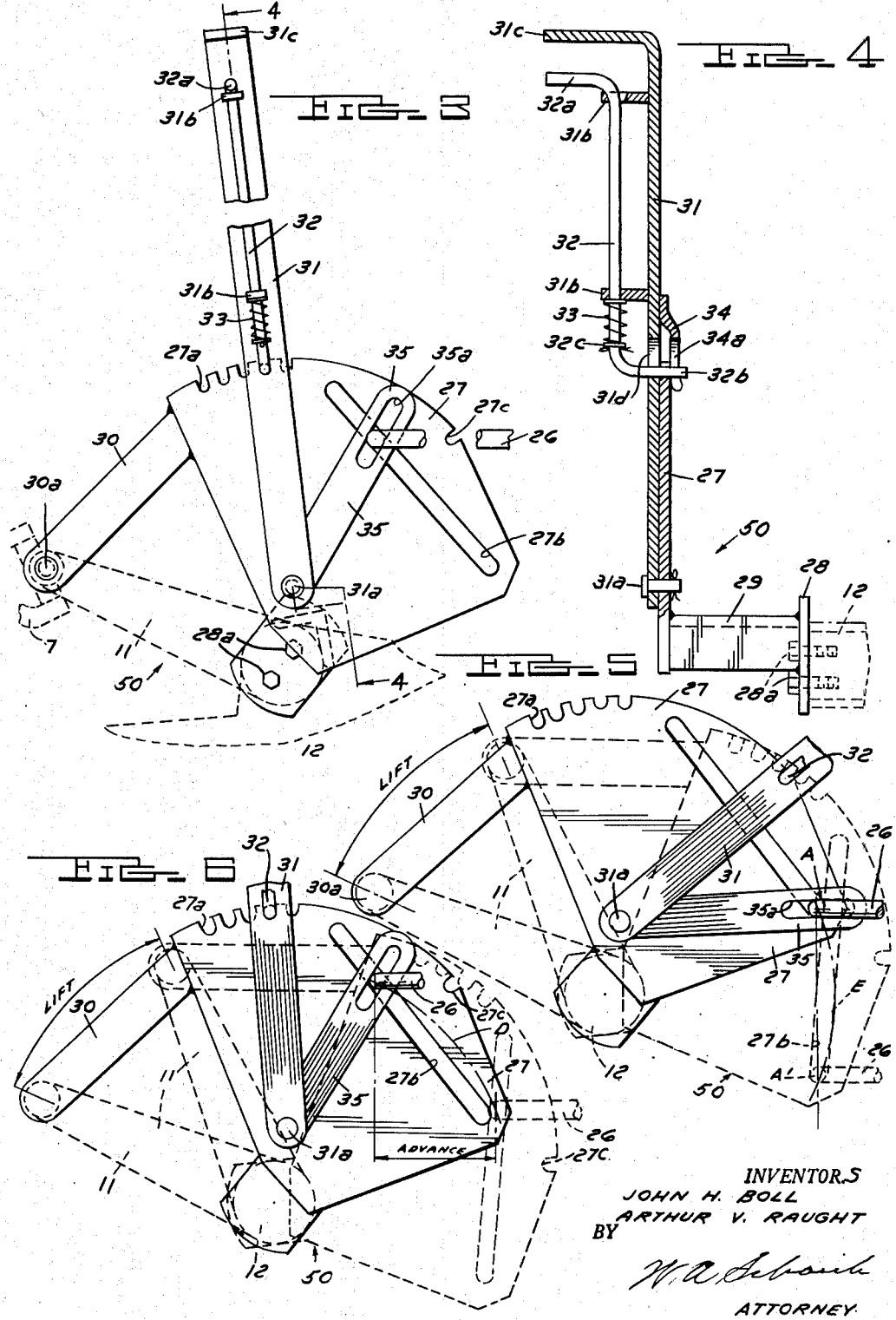

2,629,307

UNITED STATES PATENT OFFICE 2,629,307

IMPLEMENT POWER LIFT AND POSITION CONTROL

John H. Boll, Dearborn, and Arthur V. Raught, Birmingham, Mich., assignors to Dearborn Motors Corporation, Birmingham, Mich., a corporation of Delaware Application November 23, 1951, Serial No. 257,780

1 Claim. (Cl. 97—50)

This invention relates to a power lift for implements and particularly to a lift for power raising a front mounted cultivator.

Cultivators are usually mounted on the front end of a tractor primarily because of better operator visibility which permits the operator to more easily guide the tractor and at the same time observe the proximity of the cultivating tools to the crops being cultivated. It is also desirable that the front mounted cultivator be power lifted inasmuch as the implement is relatively heavy. Another important desideratum is to raise the cultivator gangs to a transporting height and to have such gangs return to the same height regardless of the working depth setting of the earth working tools.

Hence a power-operated lift for front mounted tractor cultivators should permit the operator to rapidly raise the implement when conditions may so require, such as when reaching the end of the rows, crossing a grassed waterway or upon observing an obstruction in the path of the tractor. Not only should the power lift provide for rapid raising of the cultivating implement but also selective working depth of the cultivating gangs should be conveniently obtainable. Thus the cultivating implement would be more versatile permitting its use in different types of crops and for operation in various soil conditions which may require working at various depths.

In contour cultivating particularly, it is frequently desirable that the cultivating implement mounted on the front of the tractor be split into right and left hand gangs so that such gangs may be selectively raised or lowered to permit working out point rows as in contour planted crops. Without such a feature large portions of intersecting rows would be removed by the lowered cultivator gange on one side. In addition, it is frequently desirable that one or the other front gang be in a raised, inoperative position as when cultivating crops along a road or irrigation ditch. At still other times it is desirable to be able to operate the hydraulic rock shaft of the tractor without affecting the position of the front cultivator gangs.

A particular object of this invention is to provide a power lift on a tractor provided with a power actuated rock shaft located in close proximity to the operator which is directly operated by the rock shaft for power lifting front mounted implements.

Another object of this invention is to provide an improved implement lift for a tractor front mounted implement which is operated by the tractor power for power lifting of the implement, manually operated adjusting mechanism being provided for selective depth adjustment of the earth working elements of the implement.

Still another object of this invention is to provide an improved lifting mechanism for front mounted implements on a tractor having power lifted trailing hitch links characterized by the fact that lifting mechanism may be adjusted to produce lifting movement of the trailing hitch links without effect upon the vertical position of the front mounted implement.

A further object of this invention is to provide an implement power lift for a tractor having power lifted rock arms which are conveniently utilized to power the improved lift for selectively raising or lowering the implement.

Still another object of this invention is to provide an improved power lift for a tractor which will raise the cultivating gangs to the same maximum height for transport purposes regardless of their working depth setting.

The specific nature of this invention, as well as other objects and advantages thereof, will become apparent to those skilled in the art from the following detailed description, taken in conjunction with the two sheets of drawings on which, by way of preferred example only, is illustrated one embodiment of this invention.

On the drawings:

Figure 1 is a side elevational view of a tractor showing the improved power lift of this invention mounted on the tractor illustrating the maximum and minimum height adjustment obtainable with this power lift;

Figure 2 is a view similar to Figure 1 showing the front mounted cultivator gang maintained in a raised position throughout the range of movement of the tractor rock arms;

Figure 3 is an enlarged detail view of the power rotated quadrant utilized for obtaining the various height adjustments of the implement;

Figure 4 is a sectional view taken along the plane 4—4 of Figure 3;

Figure 5 is an enlarged detail view similar to Figure 3 showing the position of the various elemnts for holding the implement in the raised position shown in Figure 2;

Figure 6 is a view similar to Figure 5 but showing the position of the adjusting elements for lowering the implement to a ground working position; and Figure 7 is a fragmentary detail view of the tractor rear end showing the connection of the rear cultivating gang to the tractor rock arms.

As shown on the drawings:

In Figure 1 there is shown a tractor 10 of a well-known type which has a pair of laterally spaced rock arms 11 respectively secured to the ends of a rock shaft 12 journaled on top of the transmission housing 13 of the tractor 10 as best shown in Figures 1 and 2. This location is, of course, in close proximity to the operator's seat (not shown). Rock shaft 12 is rotated by a built-in hydraulic mechanism, not shown. A pair of hitch links 9 are respectively secured at laterally spaced points 9a on the tractor differential housing 8. Hitch links 9 are respectively connected by links 7 to the ends of lift arms 11 whereby such hitch links 9 are vertically lifted.

A rear cultivating gang (or any other appropriate implement) is mounted on hitch links 9. Such rear gang may comprise essentially a pair of longitudinal arm members 6 having their forward ends respectively suitably pivotally mounted to the tractor rear axle housing 5. The trailing ends of connecting members 6 are respectively flexibly secured by chains 6a to the ends of a transverse tubular bar 4 suitably mounted on the trailing ends of hitch links 9. Earth working elements (not shown) are, of course, secured to the arms 6.

On the front end of tractor 10 a pair of forwardly projecting brackets 14 are suitably secured to the tractor front axle (not shown). Brackets 14 are transversely spaced and are respectively disposed on opposite sides of the tractor radiator, as best shown in Figure 2. Brackets 14 transversely support a tool bar 15 which is detachably secured to arms 14 within suitable brackets 16 as by clamp members 17.

A pair of transversely spaced upstanding lugs 18 are welded to the top of tool bar 15 and a pair of bell cranks 19 are respectively pivotally secured by bolts 20 to such upstanding arms. A pair of depending struts 21 are respectively secured to the underside of brackets 16 in depending relationship and a pair of parallel links 22 are pivotally secured in vertically spaced relationship by bolts 22a to the depending strut 21. The other ends of parallel links 22 are suitably pivotally secured to a vertical arm 23 which has horizontally welded to its lower end a cultivating tool supporting arm 24. The upper parallel link 22 is connected to the rearwardly disposed arm of bell crank 19 by a link 25. A similar linkage arrangement (not shown) is provided on the other side of tractor 10. The forwardly disposed arm of bell crank 19 has a longitudinal link 26 connected to its end and link 26 extends rearwardly for connection to the power lift mechanism about to be described. As the tool bar mounting forms no part of this invention, further description of such mounting is believed unnecessary.

The power lifting device 50 constructed in accordance with this invention may also be called a motion-translating device and comprises a plate-like quadrant 27 which is secured to one end of rock shaft 12. The connection of quadrant 27 to the end of rock shaft 12 is effected by a substantially rectangular plate 28 vertically secured by a pair of bolts 28a to the end of shaft 12 and a horizontal angle bar 29 which has its ends respectively welded to the vertical plate 28 and to the vertex of quadrant 27. A reinforcing bar 30 is welded at its upper end to the rear edge of quadrant 27 and at its lower end is secured to the free end of rock arm 11 by a transverse bolt 30a, hence rotation of rock shaft 12 effects rotation of quadrant 27.

Somewhat above the vertex of quadrant 27 a link positioning lever 31 is pivotally secured to quadrant 27 by a bolt or pin 31a. A plurality of evenly spaced notches 27a are provided on the peripheral edge of quadrant 27 adjacent the rearmost end of the quadrant and such notches are selectively engageable by a detent 32 carried by lever 31 to secure lever 31 in any one of a plurality of positions for a purpose to be later explained. A single notch 27c is provided substantially forwardly of the series of notches 27a for a purpose to be later explained. Detent 32 is a rod-like member and is vertically supported in a pair of longitudinally spaced apertured lugs 31b welded to the face of lever 31 as best shown in Figure 4. The upper end of detent 32 is outwardly bent as shown at 32a and underlies an outwardly bent end portion 31c of lever 31 where it may be conveniently grasped by the tractor operator to raise the lower end portion 32b of detent 32 out of engagement with one of the notches 27a. The lower end of detent 32 is oppositely bent to that of the end 32a so that such bent end will conveniently traverse the notched peripheral edge of quadrant 27. A spring 33 having one of its ends abutting the lower lug 31b of lever 31 and its other end abutting a suitable stop 32c provided on detent 32 biases the lower bent end portion 32b of detent into engagement with a selected notch 27a. A clip-like element 34 is welded to the back of lever 31, as shown in Figure 4, and such element overlies the upper peripheral edge of quadrant 27 to slidably engage the back surface of quadrant 27 to support the upper end of lever 31 relative to quadrant 27. A suitable slot 34a is provided in clip 34 to permit vertical movement of the bent end 32b of detent 32. It should also be mentioned here that lever 31 has a vertical slot 31d substantially opposite the notches 27a of quadrant 27 to permit vertical movement of end 32a in such lever.

Link positioning lever 31 has an arm or second lever portion 35 secured thereto by welding near its pivoted end, as best shown in Figure 3. Lever 35 is disposed at an acute angle to lever 31 and has a longitudinal slot 35a. A substantially chordally disposed slot 27b is provided in quadrant 27 and such slot intersects slot 35a of lever 35. The trailing end of link 26 is bent at right angles and such trailing end is inserted through the point of intersection of the slots 35a and 27b and such projecting end is suitably secured within such slots to prevent displacement therefrom. The appended drawings show but one power lift adjusting device attached to one side of the tractor. An identical power lifting device 50 is secured to the other end of the rock shaft 12 for power lifting of the left hand implement gang (not shown) also mounted on the front end of the tractor.

*Operation*

As the power-operated lift functions the same whether it be on the right or left hand side of the tractor or on both sides, only the operation of the power lift device shown on the right hand side of the tractor, as illustrated in Figures 1 and 2, will now be described. To more fully appreciate the working of this improved power lift it should be borne in mind that the power rotated rocks arms 11 raise simultaneously as such arms are respectively secured to the ends of rock shaft 12.

In Figure 2, levers 31 and 35 are adjusted to the position where movement of rock arm 11 will produce no appreciable vertical adjustment of the vertical tool support 23. For obtaining this setting of the power lifting device, the lever 31 is manually rotated until the detent 32 can be engaged with the forward notch 27c. Referring now to Figure 5, it will be noted that the slot 35a of lever 35 intersects slot 27b at the point A, and link 26 will be moved to the lower end of slot 27b. Assume also that the rock arm 11 is also in its lowermost angular position of vertical adjustment. Now when rock arm 11 is rotated through its maximum angular rotation, the quadrant 27 being affixed to such rock arm will rotate in a clockwise direction as shown in Figure 5 with such rock arm. Obviously, lever 31 and 35 being secured to quadrant 27 are likewise rotated the same angular extent as rock arms and quadrant 27; hence crank arm 35 will carry with it the end of link 26. As quadrant 27 rotates, slot 27b will assume a substantially vertical position at the end of the angular movement of quadrant 27 and the point of intersection A of slots 27b and 35a describes an arcuate path E in moving to the position A'. From an inspection of Figure 5 it will be noted that the bottom of slot 27b in the raised position of rock arm 11 is vertically aligned with the bottom of slot 27b in the lowered position of rock arm 11; hence no appreciable forward linear movement of link 26 is permitted when the lever arms 31 and 35 are positioned as shown in Figures 2 and 5 as the path of movement of the point A is substantially equidistant from bell crank 19. Obviously, due to the arcuate path described about the center of rock shaft 12, a slight forward movement of link 26 will be evident but as rock arm 11 reaches its uppermost position, link 26 will have been moved rearwardly slightly to substantially the same position prior to raising of the rock arms 11. Hence there will be no appreciable movement of bell crank 19, and the tool support arm 23 will be maintained in a raised position.

Referring now to Figures 1 and 6, the adjusting levers 31 and 35 are shown in a rearward position with detent 32 engaging one of the notches 27a which are substantially angularly disposed from the forward notch 27c. In this position the end of link 26 is moved to the upper end of slot 27b in quadrant 27. Lever 31 is substantially vertical when rock arm 11 is rotated to its lowermost position. The full lines in Figure 1 indicate such positioning of the various elements of the power lifting device and also in more detail in Figures 3 and 6. When the rock arm 11 is raised, the quadrant 27 will again be rotated in a clockwise direction. The end of link 26 being positioned near the upper end of slot 27b will then be moved to the position shown in Figure 6 following a downward path described by the arc D until it reaches the lower position indicated in dotted outline in Figure 6. In this instance, inasmuch as the lever arms 31 and 35 are positioned as shown in Figure 6, the link 26 will be longitudinally advanced the amount indicated in such figure and labeled "advance." Thus pivotal movement will be imparted to bell crank 19 and hence the vertical support 23 will be raised from its lowermost position shown in full outline in Figure 1 to its dotted position. It will be obvious that by selectively positioning lever 31 so that detent 32 engages any of the other notches 27a in quadrant 27 a slightly greater or lesser amount of raising of the vertical tool support 23 can be readily obtained and thus a greater or lesser penetration of the earth working tools, not shown, can be readily provided.

The power lift unit 50 will always raise the front gang to the same height regardless of the positioning of the link 26 in the quadrant. This desirable feature is accomplished by virtue of the vertical position of slot 27b when the quadrant is rotated clockwise to its extreme forward position. Hence the maximum lift height of the gang will always be attained for clearance in transporting.

As an identical device but of opposite hand is provided on the other side of the tractor (not shown), its operation will, of course, be identical; hence description thereof is not believed necessary. It will be appreciated by those skilled in the art that with a similar device on the opposite side of the tractor that the right or left hand front mounted implement gangs can be selectively raised or lowered and may be adjusted to work at the same or different depths as may be desired.

It will, of course, be appreciated that upward rotary movement of lift arms 11 will effect raising of the rear gang arms 6. Hence when the front gangs are raised the rear gang arms 6 will be raised simultaneously. When lever 31 is in its foremost position (Figure 2) the rear gang arm can be raised or lowered without affecting the front gangs which remain in their lifted position.

From the foregoing description it is clearly apparent there is here provided a simplified power lift for the tractor having power lifted rock arms which are effectively utilized to selectively raise and lower front mounted implement gangs which may be utilized for cultivating or other working of the soil. The numerous adjustments obtainable with this device thereby provides a versatile power lift for front mounted implements which permits such implements to be used in a variety of conditions and yet one which is simple yet positive in operation.

We claim:

For use with a tractor having a power actuated lateral rock shaft including a rock arm, a first implement mounted on the tractor front end for vertical movement and a second implement mounted on the tractor rear end for vertical movement and connected to the rock arm, a power lift device comprising a quadrant secured to the end of the rock shaft, a manually operable lever pivotally secured to said quadrant member, said quadrant and said lever respectively having slots formed therein, said quadrant slot being so constructed and arranged as to intersect said lever slot throughout the range of angular movement of said lever, means for securing said lever arm in any one of the plurality of angular positions relative to said quadrant, a link operatively connected at its one end to the first implement and at its other end in said slots at their point of intersection, whereby displacements of said link by said slot intersection vertically moves the first implement as the rock shaft is rotated, at least one of said angular positions of said lever producing a path of movement for the intersection of said slots which is substantially equidistant from said first implement over the entire range of movement of said quadrant, thereby maintaining said first implement in a raised position while permitting vertical adjustment of said second implement.

JOHN H. BOLL.
ARTHUR V. RAUGHT.

No references cited.